UNITED STATES PATENT OFFICE.

ISRAEL D. JEWETT, OF GREENSBURG, INDIANA.

COMPOUND FOR HEALING PUNCTURES IN PNEUMATIC TIRES.

SPECIFICATION forming part of Letters Patent No. 604,532, dated May 24, 1898.

Application filed June 15, 1896. Serial No. 595,705. (No specimens.)

*To all whom it may concern:*

Be it known that I, ISRAEL D. JEWETT, of Greensburg, in the county of Decatur, State of Indiana, have invented certain new and useful Improvements in Puncture-Healing Compounds for Pneumatic Tires; and I do hereby declare the following to be a full, clear, and exact description of the same.

This invention has for its object to provide an improved compound adapted to be injected into a pneumatic tire or equivalent structure in order to close punctures or openings accidentally formed therein by sharp objects—such as nails, tacks, &c.; and the invention consists in a compound having the ingredients to be hereinafter specified, and particularly pointed out in the appended claim.

The character of the compound produced in accordance with my present invention is such as not to affect the nature of the rubber or other material of which the tire is formed, but forms a coating over the inner surface thereof, and when the tire is punctured the compound at once, both by reason of its viscosity and because of the air-pressure within the tire, forces itself into the aperture, effectually closing it and preventing the escape of the air confined within the tire.

In carrying the invention into practice I prefer to employ liquid glycerin as a vehicle, with which I combine a powder or powdery substance, preferably a farinaceous substance, such as wheat-flour, and coloring-matter, such as graphite, and a substance to give the compound weight, such as metallic oxid, (oxid of lead or iron,) the proportions of the ingredients being such as to produce a heavy viscous liquid of sufficient fluidity to readily spread over the inner surface of the tire when injected therein.

The proportions which I prefer to employ are as follows: sixty fluid ounces of glycerin; thirty ounces of fine powder, preferably wheat-flour; twenty ounces of graphite, and twenty ounces of red oxid of iron. These substances are thoroughly mixed and all lumps or uncombined portions removed, preferably by passing the same through a strainer of any desired character, when the compound is ready to be injected into a tire.

In treating a tire of ordinary dimensions about four ounces of the compound are injected therein, preferably through the ordinary valve-opening and with the wheel in such a position as to insure a proper distribution of the compound throughout the whole inner surface of the tire.

In effect, it is found that the compound will prevent the leakage of air either through the valve or through any punctures such as ordinarily occur in the tread-surfaces of tires, and while I have particularly described the proportions of the ingredients it is obvious that these proportions may be varied within very wide limits and that the coloring-matter and matter for increasing the specific gravity of the compound may be omitted, although it is preferred that a metallic oxid should be employed in either instance.

I do not claim herein, broadly, the use of glycerin as a puncture-closing liquid; nor do I claim as my invention, broadly, a liquid carrying an inert comminuted substance.

Having thus described my invention, what I claim as new is—

The herein-described compound for healing punctures in pneumatic tires consisting of glycerin, a farinaceous powdery substance, a metallic oxid and graphite combined in substantially the proportions specified.

ISRAEL D. JEWETT.

Witnesses:
HARNY EMMERT,
GEO. W. LANHAM.